US011161567B2

(12) United States Patent
Eguchi

(10) Patent No.: US 11,161,567 B2
(45) Date of Patent: Nov. 2, 2021

(54) ELECTRIC BICYCLE

(71) Applicant: YAMAHA HATSUDOKI KABUSHIKI KAISHA, Iwata (JP)

(72) Inventor: Munemitsu Eguchi, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 158 days.

(21) Appl. No.: 16/548,891

(22) Filed: Aug. 23, 2019

(65) Prior Publication Data

US 2020/0079471 A1    Mar. 12, 2020

(30) Foreign Application Priority Data

Sep. 7, 2018 (JP) .............................. JP2018-168207

(51) Int. Cl.
| | |
|---|---|
| *B62M 6/90* | (2010.01) |
| *B62K 25/04* | (2006.01) |
| *B62M 6/55* | (2010.01) |
| *B62K 19/32* | (2006.01) |

(52) U.S. Cl.
CPC .............. *B62M 6/90* (2013.01); *B62K 25/04* (2013.01); *B62M 6/55* (2013.01); *B62K 19/32* (2013.01)

(58) Field of Classification Search
CPC . B62M 6/90; B62M 6/55; B62M 6/80; B62M 6/40; B62K 25/04; B62K 19/32
See application file for complete search history.

(56) References Cited

U.S. PATENT DOCUMENTS

| | | | | |
|---|---|---|---|---|
| 7,393,125 B1 * | 7/2008 | Lai | .......................... | B62K 19/30 |
| | | | | 362/473 |
| 8,727,367 B2 * | 5/2014 | Talavasek | .............. | B62K 19/30 |
| | | | | 280/281.1 |

(Continued)

FOREIGN PATENT DOCUMENTS

| | | |
|---|---|---|
| CN | 1044990 C | 9/1999 |
| CN | 1248535 A | 3/2000 |

(Continued)

OTHER PUBLICATIONS

Official Communication issued in corresponding Chinese Patent Application No. 201910841052.4, dated Sep. 25, 2020.

(Continued)

*Primary Examiner* — Tony H Winner
*Assistant Examiner* — Michael R Stabley
(74) *Attorney, Agent, or Firm* — Keating and Bennett, LLP

(57) ABSTRACT

An electric bicycle includes a front wheel, a rear wheel, a driving unit that transmits a driving force to at least one of the front wheel and the rear wheel, a battery housing area that is able to house a battery that supplies power to the driving unit, a head pipe, and a down frame extending from the head pipe in a diagonally downward and rearward direction of a vehicle body. The down frame includes a first extension extending in the diagonally downward and rearward direction of the vehicle body and a second extension extending in the diagonally downward and rearward direction of the vehicle body and provided side by side with the first extension in a width direction of the vehicle body. The battery housing area is located at least partially between the first extension and the second extension.

14 Claims, 14 Drawing Sheets

(56) References Cited

U.S. PATENT DOCUMENTS

| | | | |
|---|---|---|---|
| 8,979,110 B2* | 3/2015 | Talavasek | B62M 6/90 |
| | | | 280/279 |
| 9,580,141 B2* | 2/2017 | Talavasek | B62M 6/90 |
| 9,616,966 B2* | 4/2017 | Talavasek | B62K 25/28 |
| 2013/0241174 A1* | 9/2013 | Meyer | B62M 6/40 |
| | | | 280/281.1 |
| 2016/0311494 A1* | 10/2016 | Schliewert | B62K 19/30 |
| 2018/0006278 A1* | 1/2018 | Shimoda | B62M 6/90 |
| 2018/0072378 A1 | 3/2018 | Talavasek et al. | |
| 2018/0072379 A1* | 3/2018 | Talavasek | B62M 6/90 |
| 2018/0072380 A1* | 3/2018 | Talavasek | B62M 9/00 |
| 2018/0269439 A1* | 9/2018 | Yoneda | H01M 50/20 |
| 2019/0229307 A1* | 7/2019 | Mitsuyasu | B62M 6/90 |
| 2019/0308689 A1* | 10/2019 | Kitahara | B62K 19/40 |
| 2019/0329660 A1 | 10/2019 | Shieh | |
| 2019/0337588 A1* | 11/2019 | Wecker | B62K 19/40 |

FOREIGN PATENT DOCUMENTS

| | | |
|---|---|---|
| CN | 2457008 Y | 10/2001 |
| CN | 107672723 A | 2/2018 |
| DE | 200 1 2 972 U1 | 11/2000 |
| DE | 20 2013 004 427 U1 | 8/2013 |
| DE | 20 2016 008 481 U1 | 3/2018 |
| DE | 10 2018 200 891 A1 | 7/2018 |
| EP | 0 686 550 A1 | 12/1995 |
| EP | 0 716 009 A2 | 6/1996 |
| FR | 3 046 401 A1 | 7/2017 |
| JP | 09-58563 A | 3/1997 |
| JP | 2000-072072 A | 3/2000 |
| JP | 2000072072 A  * | 3/2000 ............ B62H 5/001 |
| KR | 10-2015-0127976 A | 11/2015 |
| TW | 201722780 A | 7/2017 |
| WO | 2012/123455 A1 | 9/2012 |

OTHER PUBLICATIONS

Official Communication issued in corresponding Taiwanese Patent Application No. 108132214, dated Oct. 15, 2020.

Official Communication issued in corresponding European Patent Application No. 19195260.5 dated Nov. 9, 2020.

Official Communication issued in European Patent Application No. 19195260.5, dated Jan. 3, 2020.

* cited by examiner

FIG.3
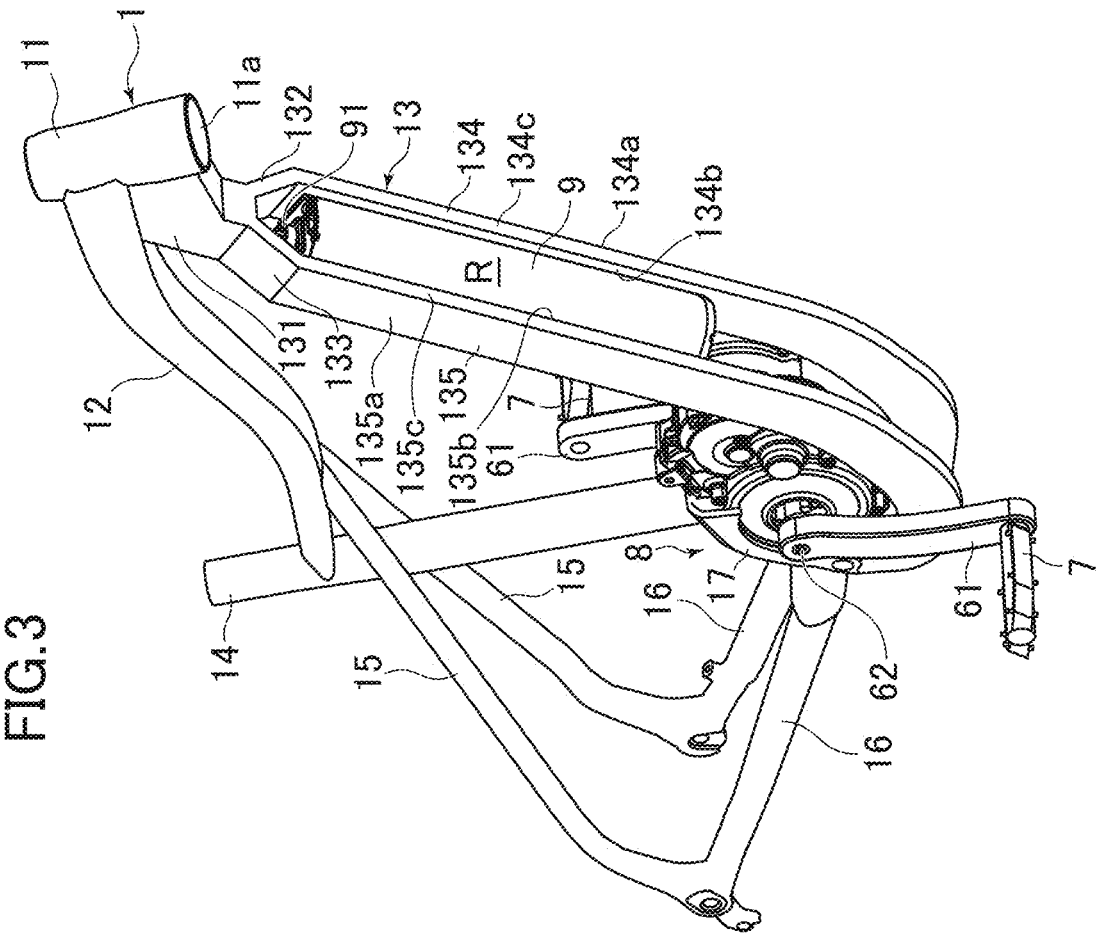
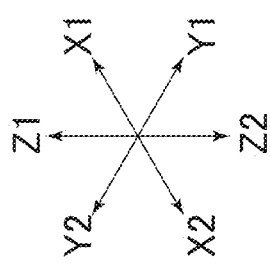

FIG.10
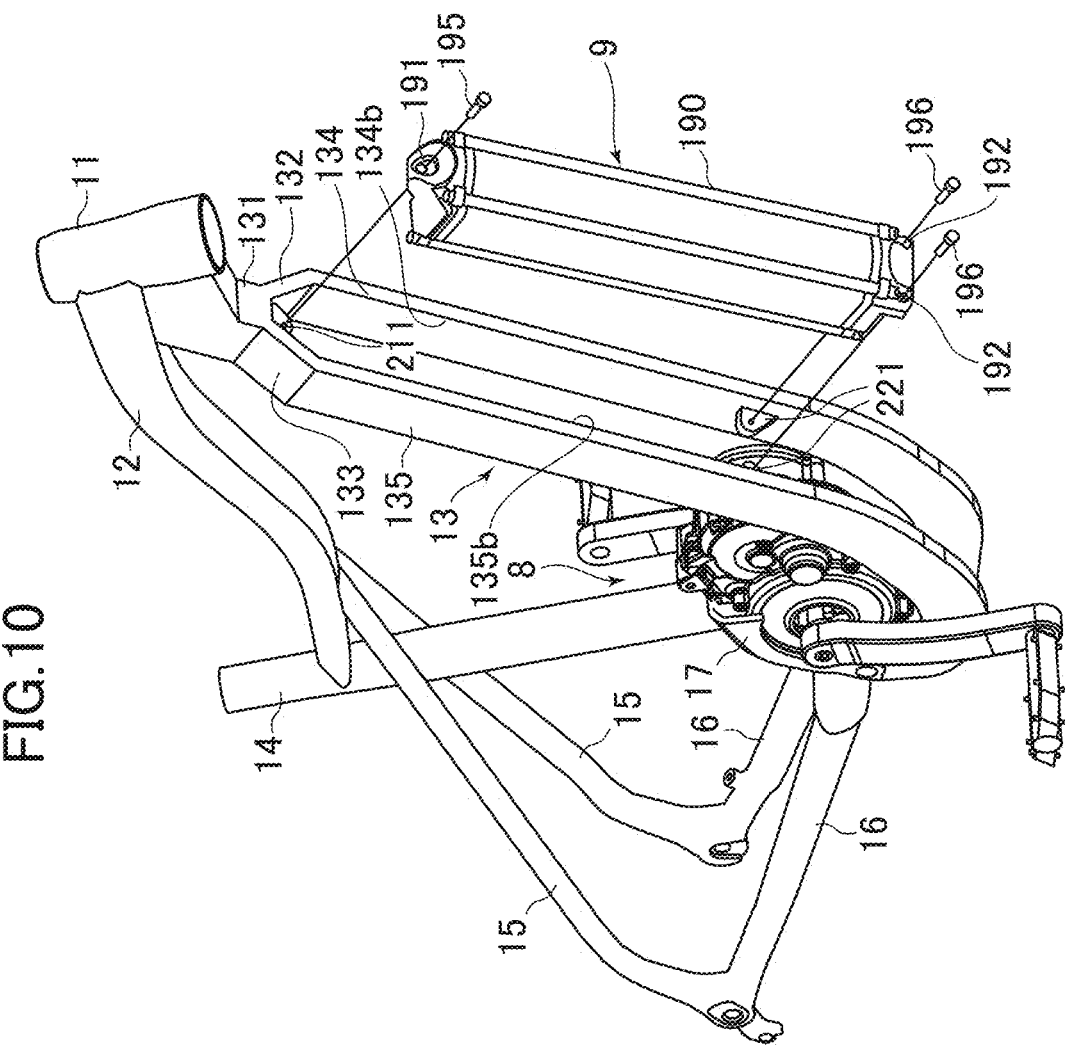
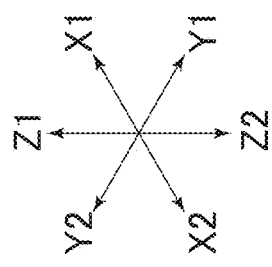

FIG.11
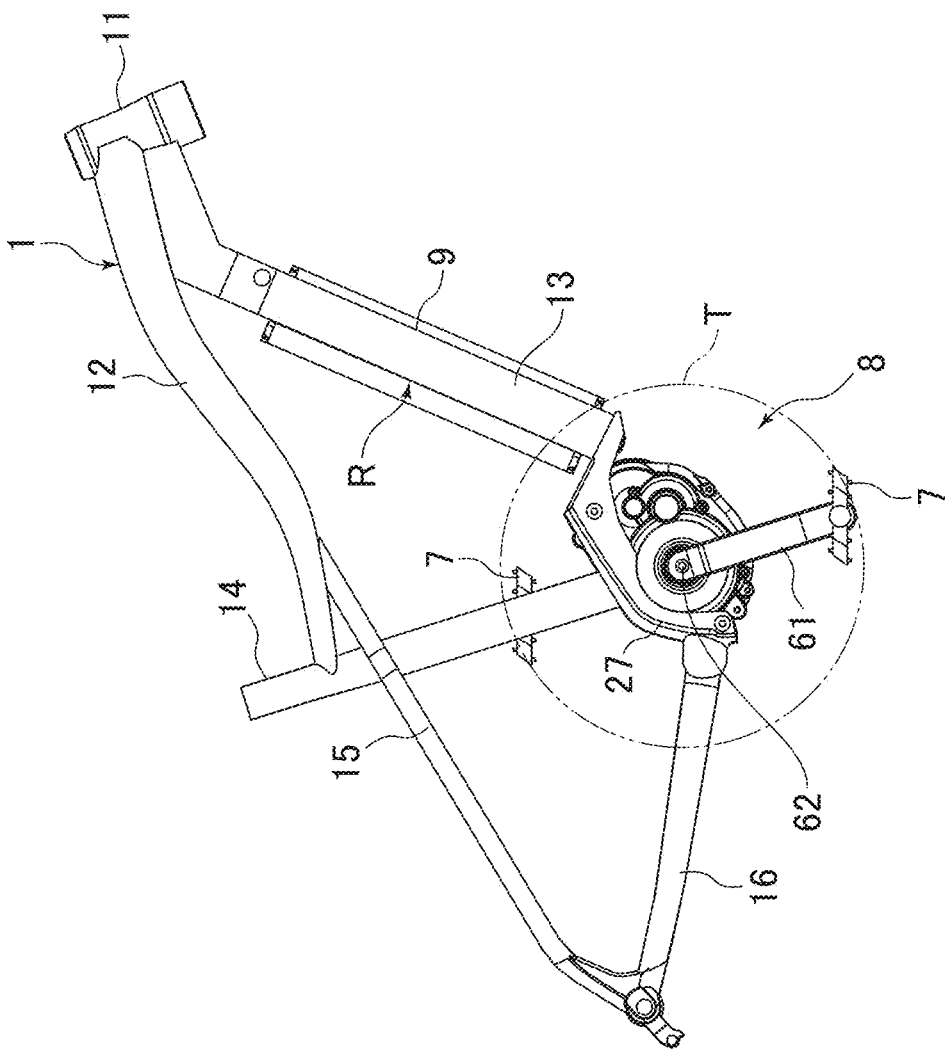
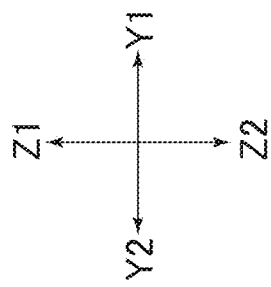

FIG.13
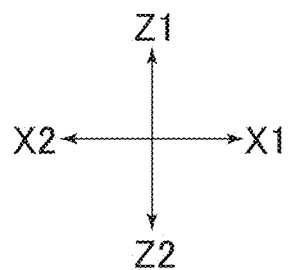
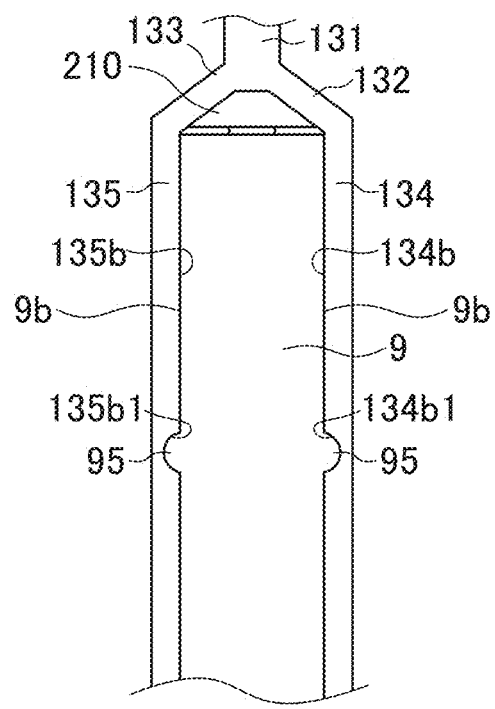

ELECTRIC BICYCLE

CROSS REFERENCE TO RELATED APPLICATIONS

This application claims the benefit of priority to Japanese Patent Application No. 2018-168207 filed on Sep. 7, 2018. The entire contents of this application are hereby incorporated herein by reference.

BACKGROUND OF THE INVENTION

1. Field of the Invention

The present disclosure relates to an electric bicycle.

2. Description of the Related Art

An electric bicycle housing a battery for supplying power to a motor is known. An electric bicycle provided with the battery behind a down tube is disclosed in JP H9-058563 A.

In the electric bicycle disclosed in JP H9-058563 A, the disposed battery stands out and is not favorable in design, and further, there is room for improvement in a way of using a space where the battery is disposed.

SUMMARY OF THE INVENTION

Preferred embodiments of the present invention provide electric bicycles that each effectively use an area that houses a battery and improve the designability thereof.

According to a preferred embodiment of the present invention, an electric bicycle includes a front wheel, a rear wheel, a driving unit that transmits a driving force to at least one of the front wheel and the rear wheel, a battery housing area that is able to house a battery that supplies power to the driving unit, a head pipe, and a down frame extending from the head pipe in a diagonally downward and rearward direction of a vehicle body. The down frame includes a first extension extending in the diagonally downward and rearward direction of the vehicle body and a second extension extending in the diagonally downward and rearward direction of the vehicle body and provided side by side with the first extension in a width direction of the vehicle body. The battery housing area is located at least partially between the first extension and the second extension. With such an electric bicycle, the area housing the battery is effectively used and designability is improved.

According to a preferred embodiment of the present invention, the down frame may include a base connected to the head pipe, a first connection that connects the base to the first extension, and a second connection that connects the base to the second extension. The first connection and the second connection may have a shape expanding in the width direction of the vehicle body so as to be spaced apart from each other. According to this structure, the down frame is easily connected to the head pipe without increasing a diameter of the head pipe.

According to a preferred embodiment of the present invention, at least a portion of a surface of each of the first extension and the second extension that faces the battery in the battery housing area is flat. According to this structure, a vehicle width is narrowed.

According to a preferred embodiment of the present invention, at least a portion of a cross-sectional shape of the first extension and the second extension in a section perpendicular to a longitudinal direction of the first extension and the second extension may be a rectangular or substantially rectangular shape, and a direction in which a short side of the rectangular or substantially rectangular shape extends may be the width direction of the vehicle body. According to this structure, the vehicle width is narrowed.

According to a preferred embodiment of the present invention, the battery may have a shape extending in the longitudinal direction of the first extension and the second extension, and the electric bicycle may include a first support that supports a first end of the battery in the longitudinal direction and a second support that supports a second end of the battery in the longitudinal direction. According to this structure, the battery is supported without applying a large load to the battery.

According to a preferred embodiment of the present invention, either one of the first support and the second support may support the battery so as to turn about an axis extending in the width direction of the vehicle body between a position in which the battery is located in the battery housing area and a position in which the battery is detached from the battery housing area. According to this structure, the battery is easily attached to the electric bicycle.

According to a preferred embodiment of the present invention, the first support and the second support may support the battery so that gaps are provided between the first extension and/or the second extension and the battery in the width direction of the vehicle body. According to this structure, cooling performance of the battery is improved.

According to a preferred embodiment of the present invention, the electric bicycle may further include a shock absorber provided in the gaps. According to this structure, the load applied to the battery is reduced or minimized.

According to a preferred embodiment of the present invention, the first support and the second support may support the battery so that the first extension and the second extension contact at least a portion of the battery in the width direction of the vehicle body. According to this structure, heat of the battery is transmitted to the first extension or the second extension thus improving the cooling performance of the battery.

According to a preferred embodiment of the present invention, the electric bicycle may further include a cover that covers a surface on a front side of the battery when the battery is located in the battery housing area. According to this structure, it is possible to protect the battery from flying gravel.

According to a preferred embodiment of the present invention, the battery may be positioned in the battery housing area by being inserted between the first extension and the second extension from the front side of the vehicle body. According to this structure, the battery is easily attached to the electric bicycle.

According to a preferred embodiment of the present invention, the battery may have a shape extending in the longitudinal direction of the first extension and the second extension, the battery has a first width and a second width that is wider than the first width, and the battery may be positioned in the battery housing area so that a direction of the first width is parallel or substantially parallel to the width direction of the vehicle body. According to this structure, the vehicle width is narrowed.

According to a preferred embodiment of the present invention, a width of the first extension and the second extension may be narrower than the second width of the battery in a side view of the vehicle body. According to this structure, the first extension and the second extension look thin, and designability thereof is improved.

According to a preferred embodiment of the present invention, the electric bicycle may further include a crank shaft and pedals that rotate with the crank shaft, the battery may be positioned in the battery housing area so that at least a portion thereof is lower than an upper end in a vertical direction of a rotation trace of the pedals in a side view of the vehicle body. According to this structure, the battery is easily attached to the electric bicycle.

According to a preferred embodiment of the present invention, the battery may be positioned in the battery housing area so that at least a portion thereof overlaps with the rotation trace of the pedals in a side view of the vehicle body. According to this structure, the battery is easily attached to the electric bicycle.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 3 is a perspective view showing a structure of a vehicle body frame and a periphery thereof according to a preferred embodiment of the present invention.

FIG. 10 is a view for explaining a support structure of the battery according to a second modified preferred embodiment of the present invention.

FIG. 11 is a side view showing the battery housing area and a periphery thereof according to a third modified preferred embodiment of the present invention.

FIG. 13 is a front view showing the battery positioned in the battery housing area according to a fifth modified preferred embodiment of the present invention.

DETAILED DESCRIPTION OF THE PREFERRED EMBODIMENTS

Hereinafter, an electric bicycle 100 according to preferred embodiments of the present invention will be explained with reference to the drawings.

Figure 1:
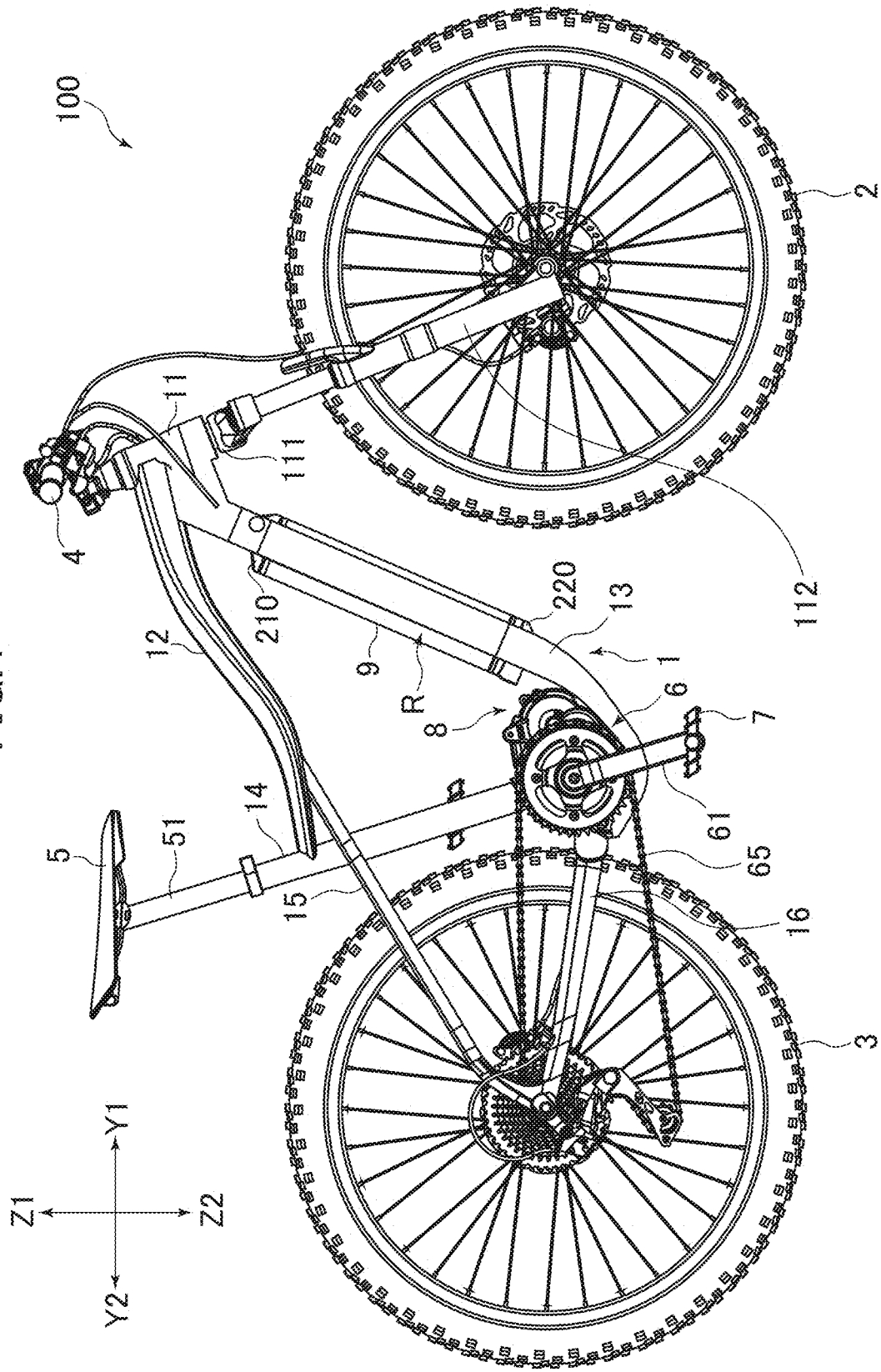
FIG. 1 is a side view showing the entire structure of an electric bicycle according to a preferred embodiment of the present invention.
Figure 2:
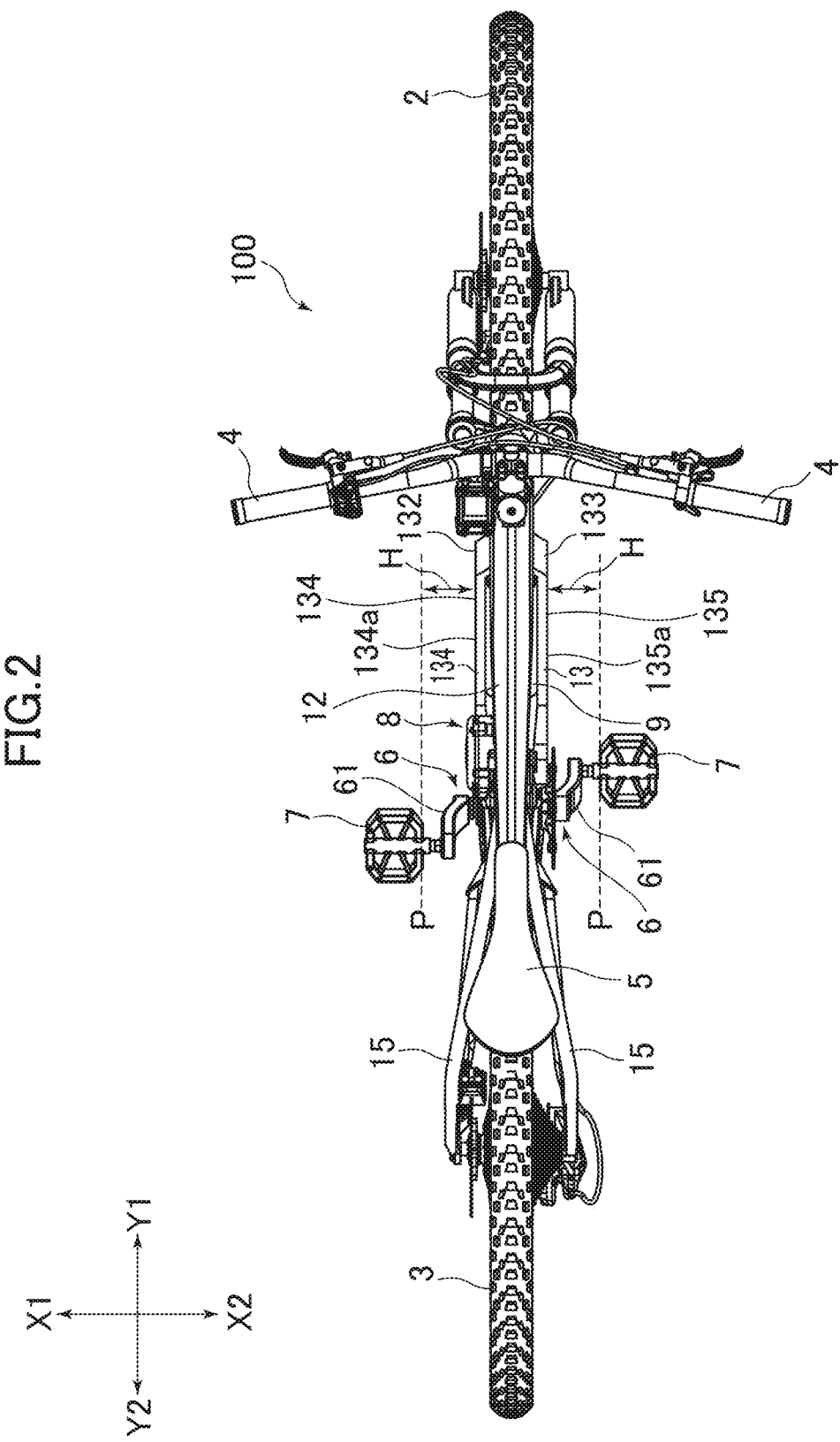
FIG. 2 is a top view showing the entire structure of an electric bicycle according to a preferred embodiment of the present invention.
Figure 4:
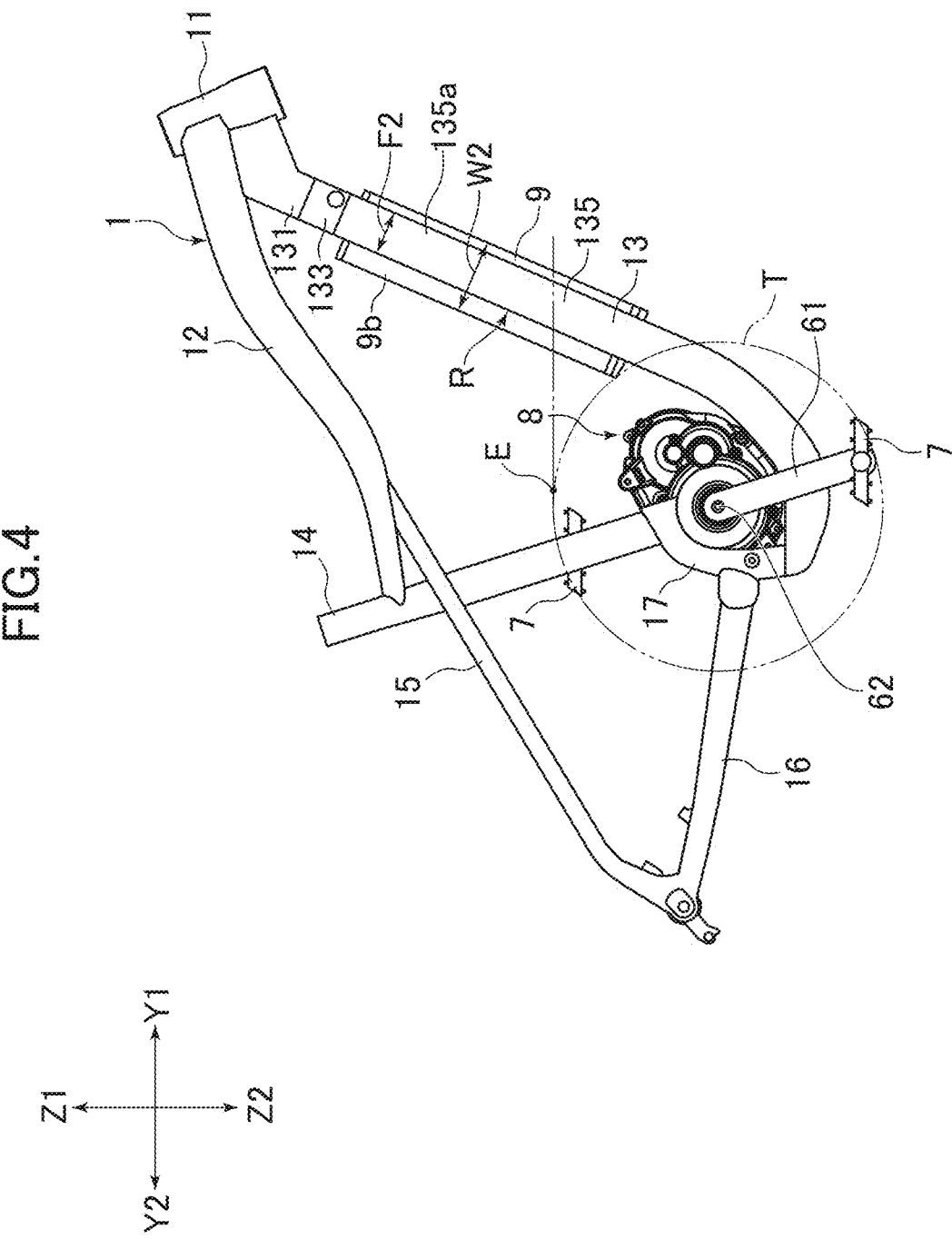
FIG. 4 is a side view showing the structure of the vehicle body frame and a periphery thereof according to a preferred embodiment of the present invention.
Figure 5:
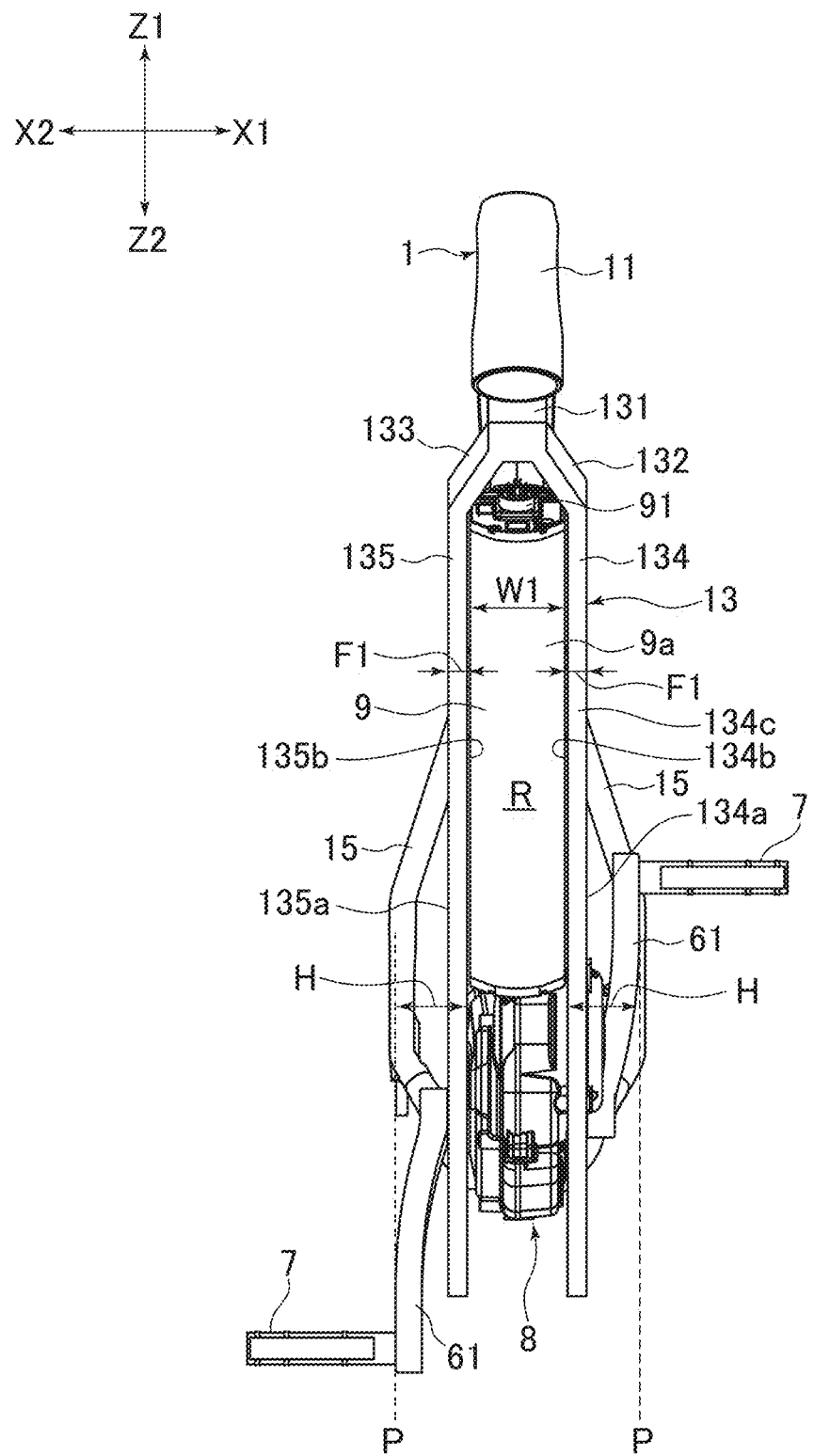
FIG. 5 is a front view showing the structure of the vehicle body frame and a periphery thereof according to a preferred embodiment of the present invention.

FIG. 1 is a side view showing the entire structure of an electric bicycle according to a preferred embodiment of the present invention. FIG. 2 is a top view showing the entire structure of the electric bicycle. FIG. 3 is a perspective view showing a structure of a vehicle body frame and the periphery thereof. FIG. 4 is a side view showing the structure of the vehicle body frame and the periphery thereof. FIG. 5 is a front view showing the structure of the vehicle body frame and the periphery thereof. In FIG. 3 to FIG. 5, a first support 210 and a second support 220 shown in FIG. 6 and so on are not shown.

In the following description in FIG. 2 and so on, a direction shown by X1 is referred to as a left direction, a direction shown by X2 is referred to as a right direction, and a direction of X1-X2 is referred to as a right and left direction. In a preferred embodiment of the present invention, the right and left direction indicates a width direction of a vehicle body. Moreover, in FIG. 1 and so on, a direction shown by Y1 is referred to as a front direction, a direction shown by Y2 is referred to as a rear direction, and a direction shown by Y1-Y2 is referred to as a front and rear direction. Also in FIG. 1 and so on, a direction shown by Z1 is referred to as an upper direction, a direction shown by Z2 is referred to as a lower direction, and a direction shown by Z1-Z2 direction is referred to as an upper and lower direction.

The electric bicycle 100 is an electric bicycle that travels by transmitting a force to the wheels, which force is obtained by adding a driving force from a driving unit including an electric motor and the like to a pedal force applied to the pedals by a rider.

As shown in FIG. 1 and FIG. 2, the electric bicycle 100 includes, as main components, a vehicle body frame 1, a front wheel 2, a rear wheel 3, handlebars 4, a saddle 5, a crank 6, pedals 7, and a driving unit 8. The electric bicycle 100 also includes a battery housing area R that is able to house a battery 9 that supplies power to the driving unit 8.

As shown in FIG. 3 and so on, the vehicle body frame 1 includes a head pipe 11, a top frame 12, a down frame 13, a seat tube 14, a seat stay 15, a chain stay 16, and a bracket 17.

The head pipe 11 is located at a front end of the vehicle body frame 1 and includes an insertion hole 11a into which a steering column 111 is inserted so as to rotate. As shown in FIG. 1, the handlebars 4 are located above the steering column 111, and a front fork 112 that supports the front wheel 2 so as to rotate is provided at a lower portion of the steering column 111.

The top frame 12 extends from the head pipe 11 in a diagonally downward and rearward direction, and a rear end thereof is connected to the seat tube 14. A cross-sectional shape of the top frame 12 in a section perpendicular to the longitudinal direction of the top frame 12 may be a circular or substantially circular shape or a rectangular or substantially rectangular shape. The top frame 12 may be a hollow tubular member.

The down frame 13 extends from the head pipe 11 in a diagonally downward and rearward direction at a position lower than the top frame 12, and a rear end thereof is connected to the bracket 17. Details of the structure of the down frame 13 will be described below.

A seat post 51 that supports the saddle 5 on which the rider sits is inserted into an upper end of the seat tube 14. The seat tube 14 extends in a diagonally downward and forward direction, and a lower end thereof is connected to the bracket 17.

The seat stay 15 extends from the top frame 12 in a diagonally downward and rearward direction. The chain stay 16 extends from the bracket 17 in a rearward direction. A lower end of the seat stay 15 is connected to a rear end of the chain stay 16, and the rear wheel 3 is supported at the connected position so as to rotate.

The crank 6 includes a crank shaft 62 extending in the width direction of the vehicle body and crank arms 61 that rotate about the crank shaft 62. The pedals 7 are attached to tip ends of the crank arms 61. The crank arms 61 and the crank shaft 62 rotate by the pedal force applied to the pedals 7 by the rider, and a rotation force thereof is transmitted to the rear wheel 3 through a chain 65.

The driving unit 8 includes the electric motor and so on, which is supported by the bracket 17.

The driving unit 8 transmits the driving force as auxiliary power to the rear wheel 3. The electric bicycle 100 travels due to a resultant power of the driving force from the driving unit 8 and the pedal force applied to the pedals 7 by the rider. However, the electric bicycle 100 may travel only by the pedal force applied to the pedals 7 by the rider, or only by the driving force from the driving unit 8. A preferred embodiment in which the driving force is transmitted to the rear wheel 3 from the driving unit 8 is shown, however, the present invention is not limited to this, and the driving force may be transmitted to at least either one of the front wheel 2 and the rear wheel 3.

The details of the down frame according to a preferred embodiment of the present invention will be explained mainly with reference to FIG. 3.

The down frame 13 includes a base 131, a first connection 132, a second connection 133, a first extension 134, and a second extension 135.

The base 131 is connected to the head pipe 11, and extends from the head pipe 11 in a diagonally downward and rearward direction of the vehicle body.

The first connection 132 extends from the base 131 in the diagonally downward and rearward direction of the vehicle body, and connects the base 131 to the first extension 134.

The second connection 133 extends from the base 131 in the diagonally downward and rearward direction of the vehicle body, and connects the base 131 to the second extension 135.

The first connection 132 and the second connection 133 have a shape that expands in the width direction of the vehicle body so as to be spaced apart from each other. That is, the first connection 132 is inclined toward the left direction so as to be spaced farther apart from the second connection 133 as it extends in the diagonally downward and rearward direction of the vehicle body, and the second connection 133 is inclined toward the right direction so as to be spaced farther apart from the first connection 132 as it extends in the diagonally downward and rearward direction of the vehicle body.

The first extension 134 extends from a lower end of the first connection 132 in the diagonally downward and rearward direction of the vehicle body.

The second extension 135 extends from a lower end of the second connection 133 in the diagonally downward and rearward direction of the vehicle body and is located side by side with the first extension 134 in the width direction of the vehicle body.

According to a preferred embodiment of the present invention, the down frame 13 includes a single base 131 as shown in FIG. 3. Only the base 131 connects the head pipe 11 to the down frame 13, and therefore, the down frame 13 is connected to the head pipe 11 without unnecessarily increasing a diameter of the head pipe 11. Moreover, a structure in which only a single base 131 is connected to the head pipe 11 is used, which facilitates the work of connecting the down frame 13 with the head pipe 11. The work of connecting the down frame 13 to the head pipe 11 is preferably performed by, for example, welding or the like. It is also possible to use a structure in which the down frame 13 does not include the base 131, and the first connection 132 and the second connection 133 are directly connected to the head pipe 11.

Since the down frame 13 includes two extensions (the first extension 134 and the second extension 135), sufficient strength and rigidity is secured without increasing a diameter of each frame.

In a preferred embodiment of the present invention, the first extension 134 and the second extension 135 each have a rectangular or substantially rectangular parallelepiped shape. That is, a cross-sectional shape of the first extension 134 and the second extension 135 in a section perpendicular to the longitudinal direction of the first extension 134 and the second extension 135 is a rectangular or substantially rectangular shape. The cross-sectional shape of the first extension 134 and the second extension 135 in the section perpendicular to the longitudinal direction is not limited to the rectangular or substantially rectangular shape, and, for example, a rectangular or substantially rectangular shape with rounded corners, polygonal shapes other than the rectangular or substantially rectangular shape and so on may be used. It may also be preferable to use shapes including a circular shape, an oval shape, shapes partially including a semicircular shape and so on.

The first extension 134 includes an outer surface 134a, an inner surface 134b, a front surface 134c, and a rear surface as shown in FIG. 3 and so on. Similarly, the second extension 135 includes an outer surface 135a, an inner surface 135b, a front surface 135c, and a rear surface. The rear surface of the first extension 134 is located on the back side of the front surface 134c, and the rear surface of the second extension 135 is located on the back side of the front surface 135c, but, symbols are not added as they are not shown in the drawings.

Broken lines in FIG. 2 and FIG. 5 show a portion of the traces P of the innermost planes of the pedals 7. When a length H between the trace P of the innermost plane of the pedal 7 and an outer surface 134a/135a of the down frame 13 is short, the legs of the rider are close to the down frame 13 at the time of pedaling the pedals 7, and it becomes difficult to pedal. Accordingly, a width F1 of the front surface 134c and the rear surface (see FIG. 5) is narrower than a width F2 of the outer surface 134a and the inner surface 134b (see FIG. 4) of the first extension 134. Similarly, a width of the front surface 135c and the rear surface is narrower than a width of the outer surface 135a and the inner surface 135b of the second extension 135. That is, the cross-sectional shape of the first extension 134 and the second extension 135 in the section perpendicular to the longitudinal direction of the first extension 134 and the second extension 135 is the rectangular or substantially rectangular shape in which a short side of the rectangular or substantially rectangular shape is the width direction of the vehicle body. When such structure is used, a width of the down frame 13 in the width direction of the vehicle body is narrowed. Accordingly, it is possible to avoid interference with the down frame 13 at the time of pedaling the pedals 7 by the rider.

Since the first extension 134 and the second extension 135 have the rectangular or substantially rectangular parallelepiped shape, the diameter of the first extension 134 and the second extension 135 is reduced while providing surfaces facing the battery 9 (the inner surfaces 134b, 135b) as compared with a case where these portions have a columnar shape. As a result, a posture of the battery 9 positioned between the first extension 134 and the second extension 135 is stabilized and a width of the down frame 13 in the width direction of the vehicle body is narrowed.

The battery 9 stores power to be supplied to the driving unit 8. The battery 9 may be charged by using a cable connected to an external outlet in a state in which the battery 9 is attached to the electric bicycle 100, or may be charged by installing the battery 9 in an external charger in a state in which the battery 9 is detached from the electric bicycle 100.

According to a preferred embodiment of the present invention, the battery 9 has a rectangular or substantially rectangular parallelepiped shape extending along a direction in which the first extension 134 and the second extension 135 extend. The battery 9 includes a first side surface 9a having a first width W1 (see FIG. 5) and a second side surface 9b having a second width W2 (see FIG. 4) that is wider than the first width W1. Then, the battery 9 is positioned in a battery housing area R so that the first side surface 9a is parallel or substantially parallel to the width direction of the vehicle body. That is, the first side surface 9a is a surface parallel or substantially parallel to a direction in which the crank shaft 62 extends. Accordingly, the width of the battery 9 in the battery housing area R in the width direction of the vehicle body is narrowed. Therefore, it is possible to avoid interference with the battery 9 and the down frame 13 at the time of pedaling the pedals 7 by the rider.

The battery housing area R of the electric bicycle 100 according to a preferred embodiment of the present invention will be explained mainly with reference to FIG. 3 to FIG. 5.

The battery 9 is attachable/detachable to/from the electric bicycle 100. The electric bicycle 100 includes the battery housing area R that is able to house the battery 9. In a preferred embodiment of the present invention, a portion of the battery housing area R is located between the first extension 134 and the second extension 135.

The battery housing area R is an area where the battery 9 exists in a state in which the battery 9 is supported by the first support 210 and the second support 220. The state in which the battery 9 is located in the battery housing area R is shown in FIG. 1 to FIG. 5.

As described above, the first connection 132 and the second connection 133 have a shape expanding in the width direction of the vehicle body so as to be spaced apart from each other in the down frame 13 as described above. Since such a structure is used, the first extension 134 and the second extension 135 are spaced apart from each other, and therefore, the battery housing area R is sufficiently secured.

In a preferred embodiment of the present invention, the width of the first extension 134 and the second extension 135 (the width F2 of the outer surface 134a, the inner surface 134b, the outer surface 135a, and the inner surface 135b) is narrower than the width of the second side surface 9b (the second width W2) of the battery 9 in a side view of the vehicle body. Accordingly, the first extension 134 and the second extension 135 look thin, which improves the designability thereof. However, the present invention is not limited to this, and it may also be preferred that the width F2 is the same as the second width W2 or that the width F2 is wider than the second width W2.

Although the width F2 of the outer surface 134a and the inner surface 134b of the first extension 134 is narrower than the second width W2 of the second side surface 9b of the battery 9 in a preferred embodiment of the present invention, the present invention is not limited to this as far as the width of the first extension 134 is narrower than the width of the battery 9 in a side view of the vehicle body. That is, only a portion of the battery 9 is hidden by the first extension 134 in the side view of the vehicle body regardless of the shape of the first extension 134 and the battery 9. The same applies to the second extension 135.

Moreover, the battery 9 is positioned in the battery housing area R so that at least a portion of the battery 9 is lower than an upper end E in a vertical direction (Z1 direction in the drawings) of a rotation trace T of the pedal 7 in the side view of the vehicle body as shown in FIG. 4. That is, the battery housing area R positioned close to the crank shaft 62 in the upper and lower direction. Accordingly, when the battery 9 is positioned in the battery housing area R, a lifting amount of the battery 9 by a user is reduced, which facilitates attachment of the battery 9 with respect to the electric bicycle 100. Furthermore, a battery 9 that is heavy in weight is located at a lower portion of the electric bicycle 100, and therefore, the center of gravity of the electric bicycle 100 is low. Accordingly, traveling of the electric bicycle 100 is stable.

Figure 6:
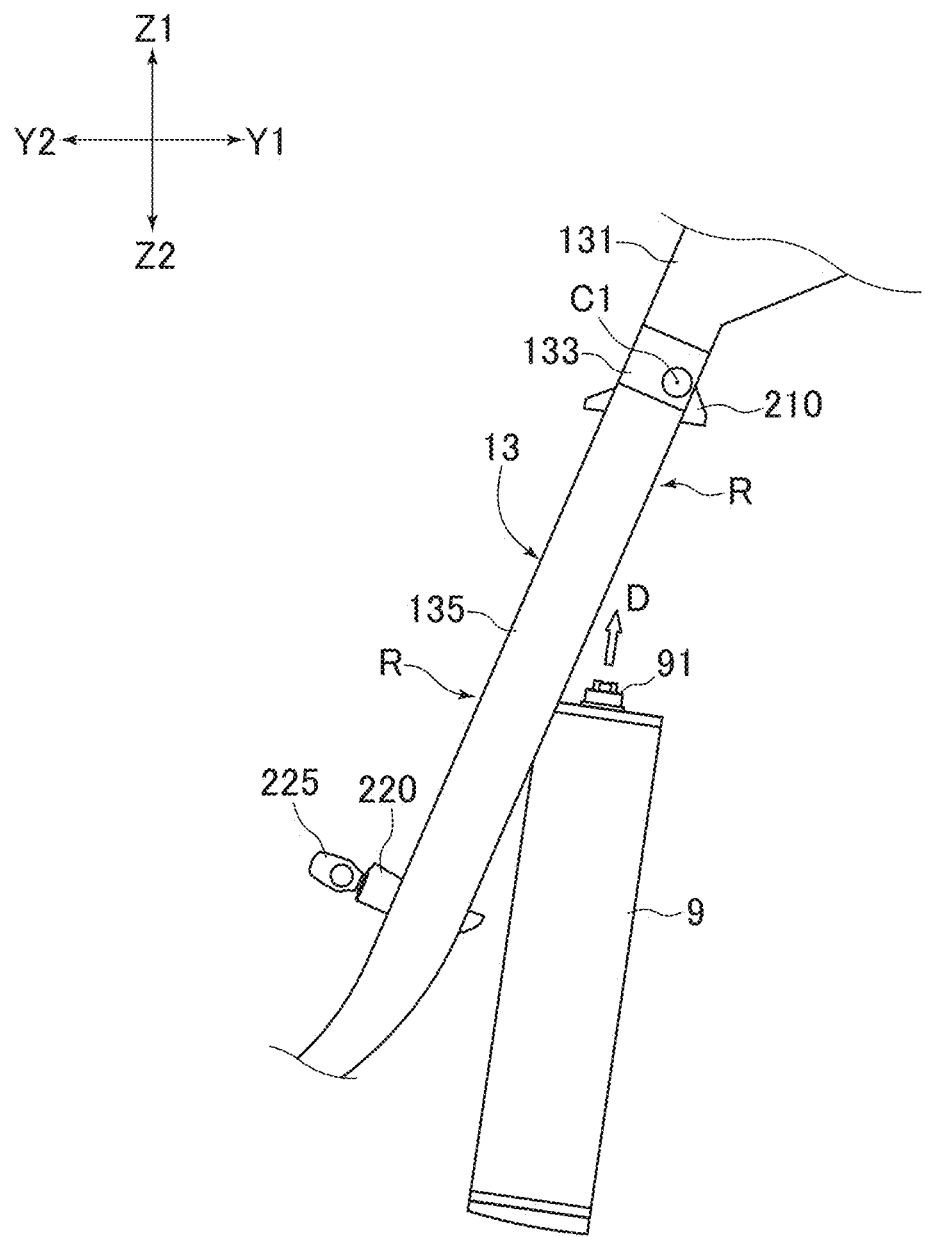
FIG. 6 is a view for explaining a support structure of a battery and a procedure for positioning the battery in a battery housing area according to a preferred embodiment of the present invention.
Figure 7:
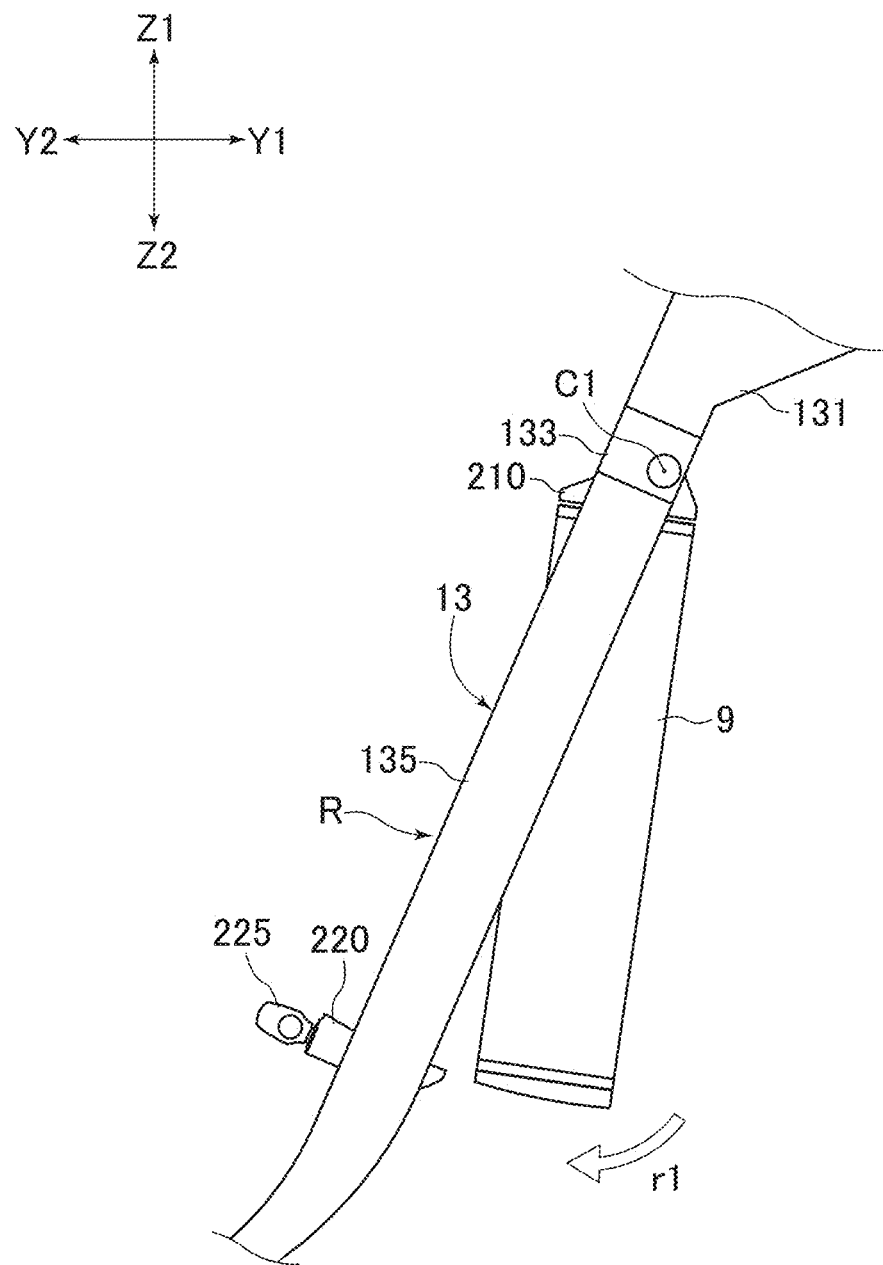
FIG. 7 is a view for explaining the support structure of the battery and a procedure for positioning the battery in the battery housing area according to a preferred embodiment of the present invention.
Figure 8:
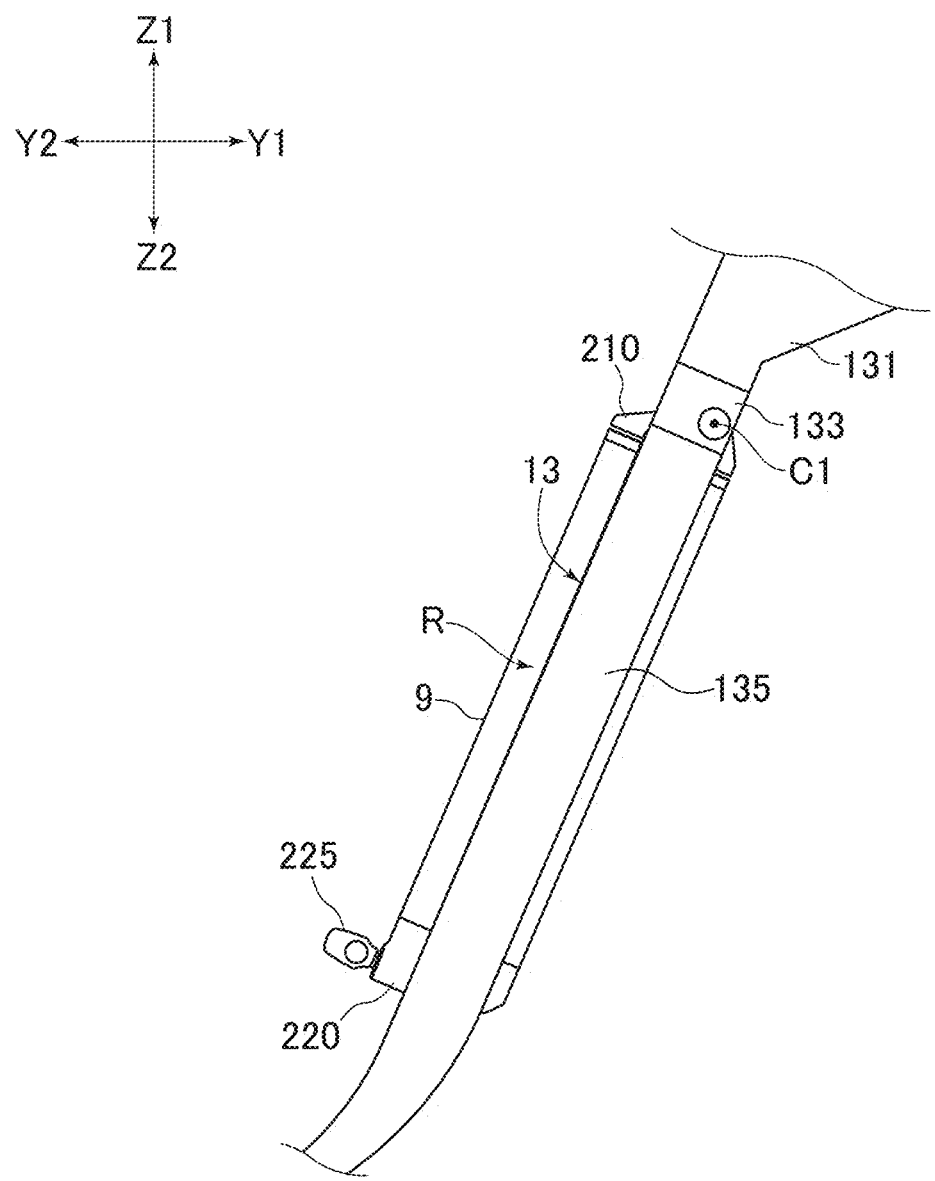
FIG. 8 is a view for explaining the support structure of the battery and a procedure for positioning the battery in the battery housing area according to a preferred embodiment of the present invention.

FIG. 6 to FIG. 8 are views for explaining a support structure of the battery and a procedure for positioning the battery in the battery housing area. In FIG. 6 to FIG. 8, a portion of the down frame 13 and the battery 9 in the side view of the vehicle body are shown.

The electric bicycle 100 includes the first support 210 that supports the upper end of the battery 9 and the second support 220 that supports a lower end of the battery 9. In a preferred embodiment of the present invention, the first support 210 is located between the first connection 132 and the second connection 133, and the second support 220 is located between the first extension 134 and the second extension 135.

The first support 210 supports the battery 9 turnably about an axis C1 extending in the width direction of the vehicle body between a position where the battery 9 is located in the battery housing area R and a position where the battery 9 is detached from the battery housing area R. Turning of the first support 210 may be performed by, for example, providing a hinge or the like in the down frame 13.

Hereinafter, a procedure for positioning the battery 9 in the battery housing area R according to a preferred embodiment of the present invention will be explained. First, as shown in FIG. 6, the battery 9 is positioned in front of and below the first extension 134 and the second extension 135 and lifted in the upper direction (direction of an arrow D) so that an upper end of the battery 9 abuts the first support 210. At this time, a power feeding connector 91 provided on the upper end of the battery 9 is preferably connected electrically to a power receiving connector (not shown) provided in the first support 210.

After that, a lower end of the battery 9 is pushed in a rear direction (direction of an arrow r1) as shown in FIG. 7. Accordingly, the battery 9 turns about the axis C1 in a state of being supported by the first support 210. Then, the lower end of the battery 9 is placed on the second support 220. Accordingly, the battery 9 is positioned in the battery housing area R as shown in FIG. 8.

In a preferred embodiment of the present invention, a structure in which only the upper end and the lower end of the battery 9 are supported by the first support 210 and the second support 220 is used. Accordingly, a physical load is not applied to portions other than the upper end and the lower end of the battery 9.

Also in a preferred embodiment of the present invention, a lock is provided in the second support 220. Specifically, a key hole (not shown) is provided in the second support 220 and a key 225 is turned clockwise or counterclockwise in a state in which the key 225 is inserted into the key hole, thus fixing the lower end of the battery 9 to the second support 220. As the battery 9 is fixed to the down frame 13 through the second support 220 as described above, it is possible to prevent the battery 9 from falling off the electric bicycle 100.

In a preferred embodiment of the present invention, the battery 9 is inserted from the front side of the vehicle body between the first extension 134 and the second extension 135 to be located in the battery housing area R. Here, it is considered that the battery 9 could be positioned in the battery housing area R from the rear side of the vehicle body, but it is difficult to secure a sufficient space according to a layout of the vehicle body frame 1 such as the top frame 12 and the seat tube 14. As the structure in which the battery 9 is positioned in the battery housing area R from the front side of the vehicles body is used as described above, the battery 9 is attached to the electric bicycle 100 easily regardless of the arrangement of the vehicle body frame 1. Also, the structure in which the battery 9 is positioned in the battery housing area R from the front side of the vehicle body improves the degree of freedom in the layout of the vehicle body frame 1 such as the top frame 12 and the seat tube 14.

When the battery 9 is positioned in the battery housing area R from the rear side of the vehicle body, i.e., from the rear direction as well as the upper direction of the down frame 13, a height of the battery 9 lifted by the user becomes high, which may be a large burden to the user depending on the weight of the battery 9. On the other hand, in the structure in which the battery 9 is positioned in the battery housing area R from the front side, the lifting amount of the battery by the user is small, and it is easy to attach the battery 9 to the electric bicycle 100.

The removal of the battery 9 from the electric bicycle 100 is preferably performed by a reverse operation of the above procedure. That is, after unlocking with the key 225, the lower end of the battery 9 is pushed in the opposite direction to the direction of the arrow r1 about the axis C1, then, the battery 9 is preferably moved downward so that the power feeding connector 91 is separated from the first support 210.

When the above support structure is used, the battery 9 is easily attached/detached as compared with a structure in which the battery 9 is fixed to the down frame 13 by using screws or the like.

Although the structure in which the first support 210 supports the upper end of the battery 9 so as to turn is used in a preferred embodiment of the present invention, the present invention is not limited to this, and a structure in which the second support 220 supports the lower end of the battery 9 so as to turn may be used. Also, although the structure in which the power feeding connector 91 is provided at the upper end of the battery 9 is used, the present invention is not limited to this. A structure in which the power feeding connector 91 is provided at the lower end of the battery 9 and the power receiving connector is provided at the second support 220 may be used. When the power feeding connector 91 is provided at the lower end of the battery 9, a position where the battery 9 is electrically connected to the electric bicycle 100 is located near the driving unit 8, which efficiently supplies power from the battery 9 to the driving unit 8.

As explained above, a portion of the battery housing area R is provided between the first extension 134 and the second extension 135 in the electric bicycle 100, and therefore, a portion of the battery 9 is hidden by the first extension 134 and the second extension 135 when located in the battery housing area R. Accordingly, the battery 9 does not unnecessarily stand out in appearance, and designability is improved. Moreover, the area between the first extension 134 and the second extension 135 is set as the battery housing area R, and therefore, space within the electric bicycle 100 is used effectively. Since the structure in which the widths of the down frame 13 and the battery 9 are not increased in the width direction of the vehicle body, interference with the battery 9 and the down frame 13 is avoided when the rider pedals, which provides a comfortable ride for the rider.

Hereinafter, modified preferred embodiments will be explained. The same symbols are given to the same components as the components explained with reference to FIG. 1 to FIG. 8, and explanation thereof is omitted.

Figure 9:
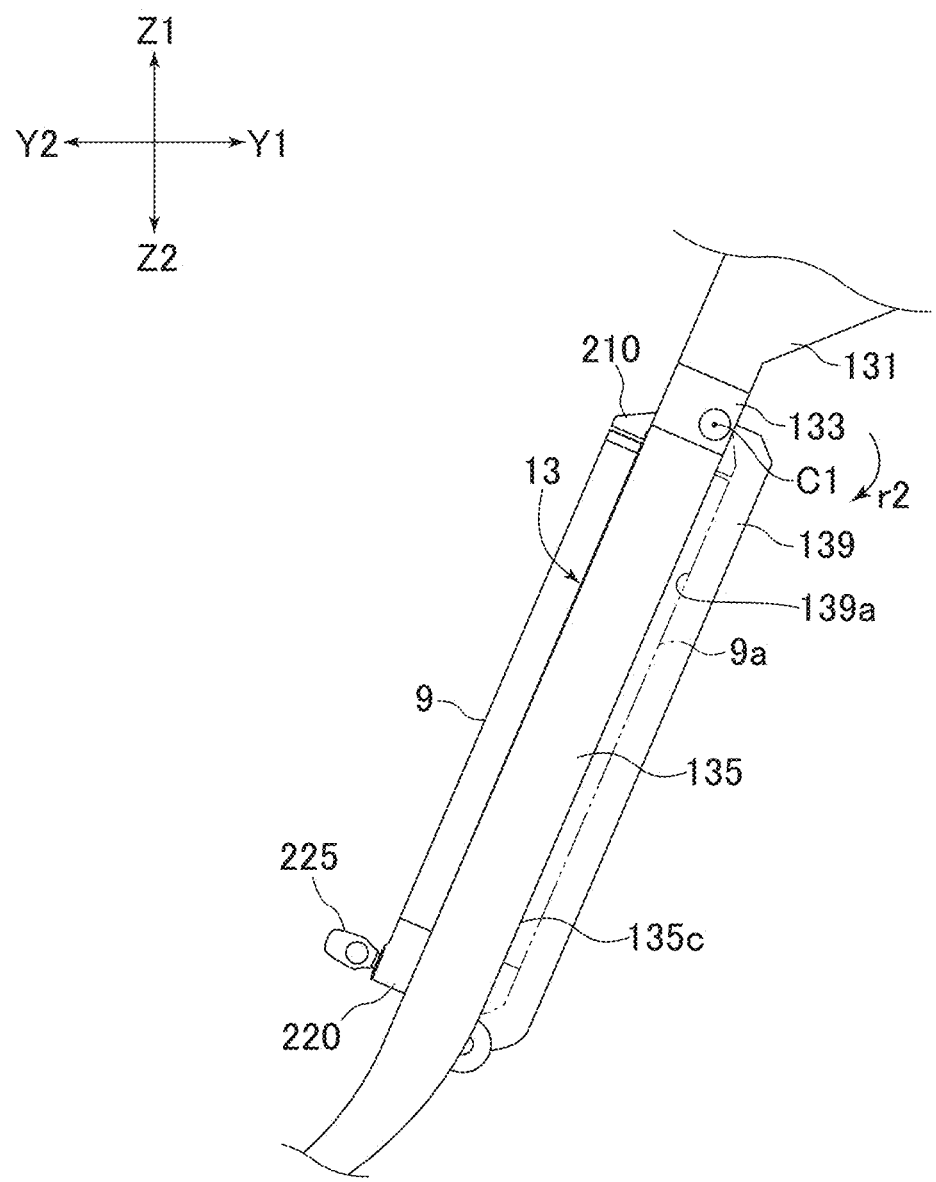
FIG. 9 is a side view showing the battery positioned in the battery housing area according to a first modified preferred embodiment of the present invention.

FIG. 9 is a side view showing the battery positioned in the battery housing area according to a first modified preferred embodiment.

The electric bicycle 100 according to the first modified preferred embodiment includes a cover 139. The cover 139 is preferably provided on the front surface 134c of the first extension 134 and the front surface 135c of the second extension 135 so as to cover the surface (side surface 9a) on the front side of the battery 9 when positioned in the battery housing area R.

The cover 139 includes a pivot provided in a lower end and a lock provided in an upper end. The pivot has a function of turning the cover 139 about an axis extending in the width direction of the vehicle body. The lock has a function of fixing the cover 139 to the down frame 13 and a function of releasing the cover 139. Then, the cover 139 is preferably supported by the down frame 13 so as to turn about the axis extending in the width direction of the vehicle body between a position of exposing the battery housing area R and a position of covering the battery housing area R in a front view. It is preferable that an upper portion of the cover 139 is turned in a direction of an arrow r2 in FIG. 9 so as to expose the battery housing area R at the time of positioning the battery 9 in the battery housing area R and at the time of detaching the battery 9 from the battery housing area R. On the other hand, when the electric bicycle 100 travels, the upper portion of the cover 139 is preferably turned in the opposite direction to the direction of the arrow r2 in FIG. 9 so as to cover the battery housing area R.

The present invention is not limited to the structure shown in FIG. 9 and the cover 139 may have the pivot provided in the upper end and the lock in the lower end. That is, the structure in which the upper end of the cover 139 is supported so as to turn may be used. When such a structure is used, the battery 9 is positioned in the battery housing area R without increasing a turning angle of the cover 139 as compared with the structure in which the pivot is provided in the lower end.

FIG. 9 shows a state in which the cover 139 is in the position of covering the battery housing area R and the battery 9 is located in the battery housing area R. It is preferable that a surface 139a on an inner side of the cover 139 supports the surface (side surface 9a) on the front side of the battery 9 in this state. It is also preferable to use a structure in which an elastic member or the like is provided on the surface 139a on the inner side of the cover 139 and the elastic member contacts the side surface 9a of the battery 9. Accordingly, shocks on the battery 9 are absorbed by the elastic member and the load applied to the battery 9 is reduced when the electric bicycle 100 travels. As the elastic member, for example, a spring member or the like that is biased toward the side surface 9a of the battery 9 with a suitable force may be used.

When the cover 139 is provided, the battery 9 is protected from flying gravel and the like during traveling of the electric bicycle 100. In a case in which the battery 9 is detached from the first support 210 and the second support 220 due to some trouble, it is possible to prevent the battery 9 from falling off to the ground.

The cover 139 is preferably made of, for example, a resinous material. The cover 139 may be attachable/detachable to/from the electric bicycle 100.

It is also preferable that a plurality of holes are provided such that a louver structure or a mesh structure is provided on the surface of the cover 139. Accordingly, it is possible to prevent the accumulation of heat of the battery 9 in the battery housing area R. As a result, the cooling performance of the battery 9 is improved.

FIG. 10 is a view for explaining a support structure of the battery according to a second modified preferred embodiment of the present invention.

The support structure of the battery 9 located in the battery housing area R is not limited to the structures shown in FIG. 6 to FIG. 8. In the second modified preferred embodiment, the battery 9 in the battery housing area R is fixed to the down frame 13 by using screws 195 and 196, for example. Specifically, a first support 211 including a screw hole is provided in the base 131 of the down frame 13, and second supports 221 including screw holes are provided in the inner surfaces 134b and 135b of the first extension 134 and the second extension 135.

Also in the second modified preferred embodiment, a battery frame 190 housing the battery 9 therein and including screw holes 191 and 192 is used. Then, the screw hole 191 of the battery frame 190 overlaps with the screw hole of the first support 211, and the screw 195 is inserted into these screw holes to fix the battery frame 190 to the first support 211. Moreover, the screw holes 192 of the battery frame 190 overlap with the screw holes of the second supports 221, and the screws 196 are inserted into these screw holes to fix the battery frame 190 to the second supports 221.

When the battery 9 is fixed to the down frame 13 by using the screws as in the second modified preferred embodiment, the possibility that the battery 9 falls off the electric bicycle 100 is further reduced. Moreover, the battery frame 190 is used instead of attaching the battery 9 directly to the electric bicycle 100, and therefore, the battery 9 is protected from flying gravel and the like without providing the above-described cover 139. Though the battery frame 190 covers the entire battery 9 as shown in FIG. 10, the present invention is not limited to this, and the battery frame 190 may include a structure in which a portion of the battery 9 is exposed. When the same structure as the support structure shown in FIG. 6 to FIG. 8 is used in the case in which the battery frame 190 is used, the first support 210 may support the battery frame 190 so as to turn.

Although an example of using screws is shown in FIG. 10, the present invention is not limited to this, and a structure in which the battery 9 is fixed to the down frame 13 by using other fixtures such as bolts and the like may be used.

FIG. 11 is a side view showing the battery housing area and the periphery thereof according to a third modified preferred embodiment.

In the third modified preferred embodiment, a bracket 27 to which the lower end of the down frame 13 is connected is provided at an upper portion of the driving unit 8 as shown in FIG. 11. When such a structure is used, a distance between the crank shaft 62 and the battery 9 in the battery housing area R is reduced as compared with the structure shown in FIG. 4. Specifically, the battery 9 is located in the battery housing area R so that at least a portion of the battery 9 overlaps with the rotation trace T of the pedal 7 in a side view of the vehicle body as shown in FIG. 11. Accordingly, the battery housing area R is located lower. Therefore, the lifting amount of the battery 9 by the user is reduced at the time of positioning the battery 9 in the battery housing area R, which facilitates attachment of the battery 9 with respect to the electric bicycle 100.

Figure 12:
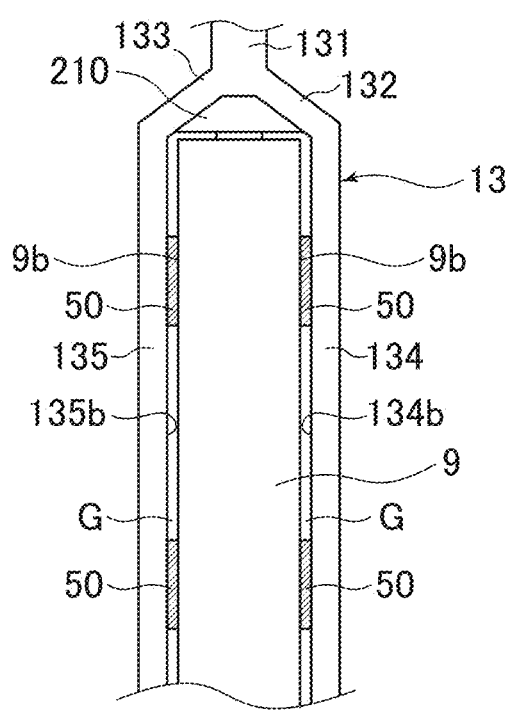
FIG. 12 is a front view showing the battery positioned in the battery housing area according to a fourth modified preferred embodiment of the present invention.

FIG. 12 is a front view showing the battery located in the battery housing area according to a fourth modified preferred embodiment.

In FIG. 5, the example in which the battery 9 is positioned in the battery housing area R without a gap with respect to the first extension 134 and the second extension 135 has been described above. In the fourth modified preferred embodiment, an example in which the battery 9 is positioned in the battery housing area R so that gaps G are provided with respect to the first extension 134 and the second extension 135 in the width direction of the vehicle body will be explained.

Since the gaps G open in a traveling direction of the electric bicycle 100 in the fourth modified preferred embodiment, wind passes through the gaps G during traveling of the electric bicycle 100. Accordingly, the accumulation of heat in the battery housing area R is prevented and cooling performance of the battery 9 is improved.

Also in the fourth modified preferred embodiment, a shock absorber 50 is provided in the gaps G as shown in FIG. 12. The shock absorber 50 is preferably made of a material that absorbs shocks. When the shock absorber 50 is provided, the battery 9 does not contact the first extension 134 and the second extension 135 during traveling of the electric bicycle 100, thus reducing or minimizing a load on the battery 9. Moreover, a posture of the battery 9 is stabilized by providing the shock absorber 50 so as to contact the battery 9.

The shock absorber 50 may be provided on the side surface 9b of the battery 9, or may be provided on the inner surfaces 134b and 135b of the first extension 134 and the second extension 135. The shock absorber 50 is not limited to being provided in only a portion of the gaps G between the battery 9 and the first extension 134 and the second extension 135, and may be provided so as to fill the entire gaps G.

FIG. 13 is a front view showing the battery located in the battery housing area according to a fifth modified preferred embodiment. In FIG. 5 and the like, the shape of the battery 9 is a rectangular or substantially rectangular parallelepiped shape having the side surfaces 9a and the side surfaces 9b, but the present invention is not limited to this. In the fifth modified preferred embodiment, an example in which the battery 9 has convex portions 95 at portions thereof will be explained.

It is preferable that the inner surfaces 134b and 135b of the first extension 134 and the second extension 135 have shapes extending along the side surfaces 9b of the battery 9 regardless of the shape of the battery 9. That is, when the battery 9 has the convex portions 95, it is preferable that the inner surface 134b of the first extension 134 has a concave portion 134b1 so as to be curved along the shape of the convex portion 95 and that the inner surface 135b of the second extension 135 has a concave portion 135b1 so as to be curved along the shape of the convex portion 95. According to such a shape, the battery 9 is fitted between the first extension 134 and the second extension 135 in a state in which the battery 9 is located in the battery housing area R, which stabilizes the posture of the battery 9.

Also in the fifth modified preferred embodiment, a structure in which the side surface 9b of the battery 9 contacts the inner surface 134b of the first extension 134 and the inner surface 135b of the second extension 135 in a state in which the battery 9 is located in the battery housing area R is used. Accordingly, the battery 9 is able to contact the first extension 134 and the second extension 135, which makes it possible to transmit heat of the battery 9 to the down frame 13 and to improve the cooling performance of the battery 9. It is also preferable to use a structure in which the battery 9 contacts the first extension 134 and the second extension 135 at least at one portion thereof, and gaps are provided at other portions as shown in FIG. 12.

Figure 14:
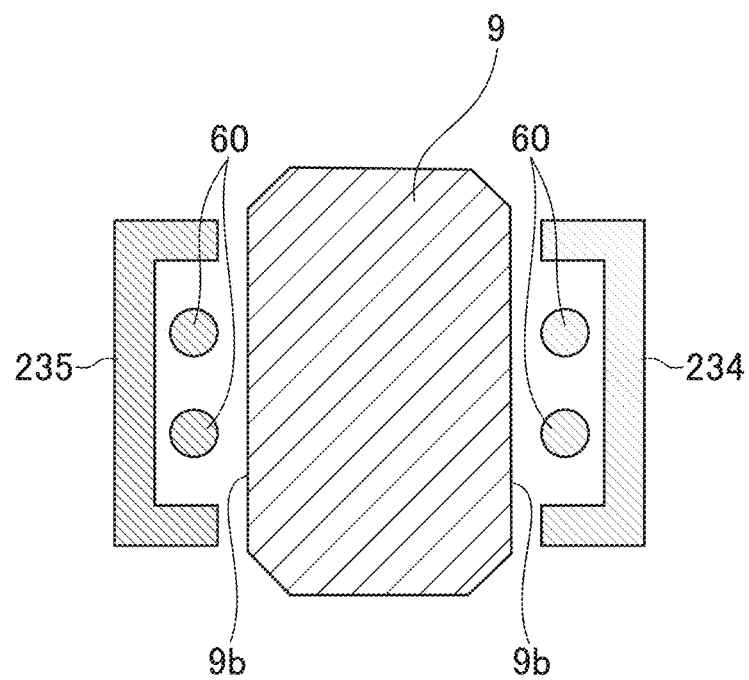
FIG. 14 is a cross-sectional view showing the battery and a down frame according to a sixth modified preferred embodiment of the present invention.

FIG. 14 is a cross-sectional view showing the battery and a down frame according to a sixth modified preferred embodiment.

The first extension 134 and the second extension 135 shown in FIG. 3 and the like have a rectangular or substantially rectangular shape, but, the shape of the first extension 134 and the second extension 135 is not limited to that. In the sixth modified preferred embodiment, a cross-sectional shape in a section perpendicular to a longitudinal direction of a first extension 234 may be U-shaped or substantially U-shaped. That is, both end portions of the first extension 234 protrude in a sectional view. A side including the protruding shapes faces the battery 9. The same applies to a second extension 235. When the first extension 234 and the second extension 235 have such a shape, the down frame is reduced in weight. Also in the sixth modified preferred embodiment, wiring 60 may be provided between the battery 9 and the first extension 234 and the second extension 235 so as to extend along the longitudinal direction of the first extension 234 and the second extension 235 as shown in FIG. 14. Accordingly, it is possible to prevent the wiring 60 from being exposed from the vehicle body frame 1, which improves the designability thereof. The wiring 60 may be power feeding lines and the like that supply power from the battery 9 to the driving unit 8.

The shapes of the first extension and the second extension are not limited to the shapes shown in FIG. 14 and the rectangular or substantially rectangular parallelepiped shape shown in FIG. 3 and the like. For example, a hollow tubular shape or a columnar shape having a peripheral surface may be used.

As explained above, the electric bicycle 100 preferably includes the front wheel 2, the rear wheel 3, the driving unit 8 that transmits a driving force to at least one of the front wheel 2 and the rear wheel 3, the battery housing area R that is able to house the battery 9 that supplies power to the driving unit 8, the head pipe 11, and the down frame 13 extending from the head pipe 11 in a diagonally downward and rearward direction of a vehicle body. The down frame 13 includes the first extension 134 extending in the diagonally downward and rearward direction of the vehicle body and the second extension 135 extending in the diagonally downward and rearward direction of the vehicle body and provided side by side with the first extension 134 in the width direction of the vehicle body. The battery housing area R is located at least partially between the first extension 134 and the second extension 135.

The down frame 13 may include the base 131 connected to the head pipe 11, the first connection 132 that connects the base 131 to the first extension 134, and the second connection 133 that connects the base 131 to the second extension 135. The first connection 132 and the second connection 133 may have the shape expanding in the width direction of the vehicle body so as to be spaced apart from each other.

In the first extension 134 and the second extension 135, at least a portion of the surfaces 134b and 135b on sides facing the battery 9 in the battery housing area R may be a flat surface.

At least a portion of a cross-sectional shape of the first extension 134 and the second extension 135 in the section perpendicular to the longitudinal direction of the first extension 134 and the second extension 135 may be the rectangular or substantially rectangular shape, and the short side of the rectangular or substantially rectangular shape extends may extend in the width direction of the vehicle body.

The battery 9 preferably has a shape extending in the longitudinal direction of the first extension 134 and the second extension 135. The first support 210 that supports a first end in the longitudinal direction of the battery 9 and the second support 220 that supports a second end in the longitudinal direction of the battery 9 may be provided.

Any one of the first support 210 and the second support 220 may support the battery 9 so as to turn about the axis C1 extending in the width direction of the vehicle body between the position in which the battery 9 is located in the battery housing area R and the position in which the battery 9 is detached from the battery housing area R.

The first support 210 and the second support 220 may support the battery 9 so that gaps G are provided between the first extension 134 and the second extension 135 and the battery 9 in the width direction of the vehicle body.

The shock absorber 50 may be provided in the gaps G.

The first support 210 and the second support 220 may support the battery 9 so that the first extension 134 and the second extension 135 contact at least a portion of the battery 9 in the width direction of the vehicle body.

The cover 139 that covers the surface on the front side of the battery 9 in the battery housing area R may be provided.

The battery 9 may be positioned in the battery housing area R by being inserted between the first extension 134 and the second extension 135 from the front side of the vehicle body.

The battery may have the shape extending in the longitudinal direction of the first extension and the second extension with the first width and the second width that is wider than the first width, and may be located in the battery housing area so that a direction of the first width is parallel or substantially parallel to the width direction of the vehicle body.

The widths of the first extension 134 and the second extension 135 may be narrower than the second width W2 of the battery in the side view of the vehicle body.

The crank shaft 62 and the pedals 7 that rotate the crank shaft 62 are provided, and the battery 9 may be located in the battery housing area R so that at least a portion thereof is positioned lower than an upper end in the vertical direction of the rotation trace T of the pedal 7 in the side view of the vehicle body.

The battery 9 may be positioned in the battery housing area R so that at least a portion thereof overlaps with the rotation trace T of the pedal 7 in the side view of the vehicle body.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An electric bicycle comprising:
   a front wheel;
   a rear wheel;
   a driving unit that transmits a driving force to at least one of the front wheel and the rear wheel;
   a battery housing area that is able to house a battery that supplies power to the driving unit;
   a head pipe; and
   a down frame extending from the head pipe in a diagonally downward and rearward direction of a vehicle body; wherein
   the down frame includes a first extension extending in the diagonally downward and rearward direction of the vehicle body and a second extension extending in the diagonally downward and rearward direction of the vehicle body and located side by side with the first extension in a width direction of the vehicle body;
   the battery housing area is located at least partially between the first extension and the second extension;
   the down frame includes a base connected to the head pipe, a first connection that connects the base to the first extension, and a second connection that connects the base to the second extension; and
   the first connection and the second connection each have a shape that expands in the width direction of the vehicle body so as to be spaced apart from each other.

2. The electric bicycle according to claim 1, wherein at least a portion of a surface of each of the first extension and the second extension that faces the battery is flat.

3. The electric bicycle according to claim 1, wherein at least a portion of a cross-sectional shape of each of the first extension and the second extension perpendicular to a longitudinal direction of the first extension and the second extension has a rectangular or substantially rectangular shape, and a shorter side of the rectangular or substantially rectangular shape extends in the width direction of the vehicle body.

4. The electric bicycle according to claim 1, wherein the battery extends in a longitudinal direction of the first extension and the second extension, and the electric bicycle includes a first support that supports a first end of the battery and a second support that supports a second end of the battery.

5. The electric bicycle according to claim 4, wherein either one of the first support and the second support supports the battery so as to turn about an axis extending in the width direction of the vehicle body between a position in which the battery is located in the battery housing area and a position in which the battery is detached from the battery housing area.

6. The electric bicycle according to claim 4, wherein the first support and the second support are positioned to support the battery so that gaps are provided between the first extension and/or the second extension and the battery in the width direction of the vehicle body.

7. The electric bicycle according to claim 6, further comprising a shock absorber located in the gaps.

8. The electric bicycle according to claim 4, wherein the first support and the second support are positioned to support the battery so that the first extension and the second extension contact at least a portion of the battery in the width direction of the vehicle body.

9. The electric bicycle according to claim 1, further comprising a cover that covers a surface on a front side of the battery in the battery housing area.

10. The electric bicycle according to claim 1, wherein the battery is positioned in the battery housing area by being inserted between the first extension and the second extension from a front side of the vehicle body.

11. The electric bicycle according to claim 1, wherein the battery extends in a longitudinal direction of the first extension and the second extension;
   the battery has a first width and a second width that is wider than the first width; and
   the battery is positioned in the battery housing area so that the first width extends parallel or substantially parallel to the width direction of the vehicle body.

12. The electric bicycle according to claim 11, wherein a width of the first extension and the second extension is narrower than the second width of the battery in a side view of the vehicle body.

13. The electric bicycle according to claim 1, further comprising:
   a crank shaft; and
   pedals that rotate with the crank shaft; wherein
   the battery is positioned in the battery housing area so that at least a portion of the battery is located lower than an upper end in a vertical direction of a rotation trace of the pedals in a side view of the vehicle body.

14. The electric bicycle according to claim 13, wherein the battery is positioned in the battery housing area so that at least a portion of the battery overlaps with a rotation trace of the pedals in the side view of the vehicle body.

* * * * *